United States Patent [19]
Saxon et al.

[11] 3,708,612
[45] Jan. 2, 1973

[54] ELECTRICAL BUSHING ASSEMBLY

[75] Inventors: James B. Saxon; Jackie J. Dunn, Sr., both of Birmingham, Ala.

[73] Assignee: Anderson Electric Corporation, Leeds, Ala.

[22] Filed: July 2, 1971

[21] Appl. No.: 159,131

[52] U.S. Cl. ............ 174/142, 174/153 R, 339/218 R
[51] Int. Cl. ............................................ H01b 17/26
[58] Field of Search...174/142, 152 R, 152 G, 153 R, 174/153 G, 194, 201; 339/126 R, 126 J, 126 RS, 218 R

[56] References Cited

UNITED STATES PATENTS

| | | | |
|---|---|---|---|
| 1,191,649 | 7/1916 | Barthels | 174/153 G UX |
| 1,218,216 | 3/1917 | Schmid, Jr. | 174/153 R X |
| 1,511,534 | 10/1924 | Steinberger | 174/142 |
| 1,869,162 | 7/1932 | Miner | 339/218 R X |
| 2,431,951 | 12/1947 | Mauerer | 339/218 R UX |
| 2,748,187 | 5/1956 | Conrad | 174/153 R |
| 2,993,082 | 7/1961 | Gainer et al. | 174/52 PE |
| 3,122,597 | 2/1964 | Lemieux | 174/84 R X |
| 3,202,757 | 8/1965 | Carlson et al. | 174/153 R |
| 3,485,503 | 12/1969 | Keto | 174/153 R UX |

FOREIGN PATENTS OR APPLICATIONS

| | | | |
|---|---|---|---|
| 269,969 | 4/1965 | Australia | 174/194 |
| 1,018,184 | 10/1952 | France | 174/152 R |
| 1,039,946 | 5/1953 | France | 174/153 R |
| 1,193,851 | 5/1959 | France | 174/76 |
| 961,770 | 6/1964 | Great Britain | 174/152 R |

*Primary Examiner*—Laramie E. Askin
*Attorney*—Harold J. Rathbun et al.

[57] ABSTRACT

The assembly is designed to be received in a circular opening in a wall of a casing for electrical apparatus, and comprises an elongated generally cylindrical bushing of insulating material molded about a cylindrical central portion of an elongated conductor with internal sealing and locking means therebetween. The bushing assembly seats in an annular recess formed by a stepped boss surrounding the opening, and the assembly is removably held in position by a snap-ring which also maintains sealing pressure on an O-ring positioned between the bushing and the inner wall of the boss. Peripherally-spaced projections on the bushing are received in respective complementary recesses formed in the inner wall of the boss to prevent rotary motion of the assembly with respect to the casing.

5 Claims, 5 Drawing Figures

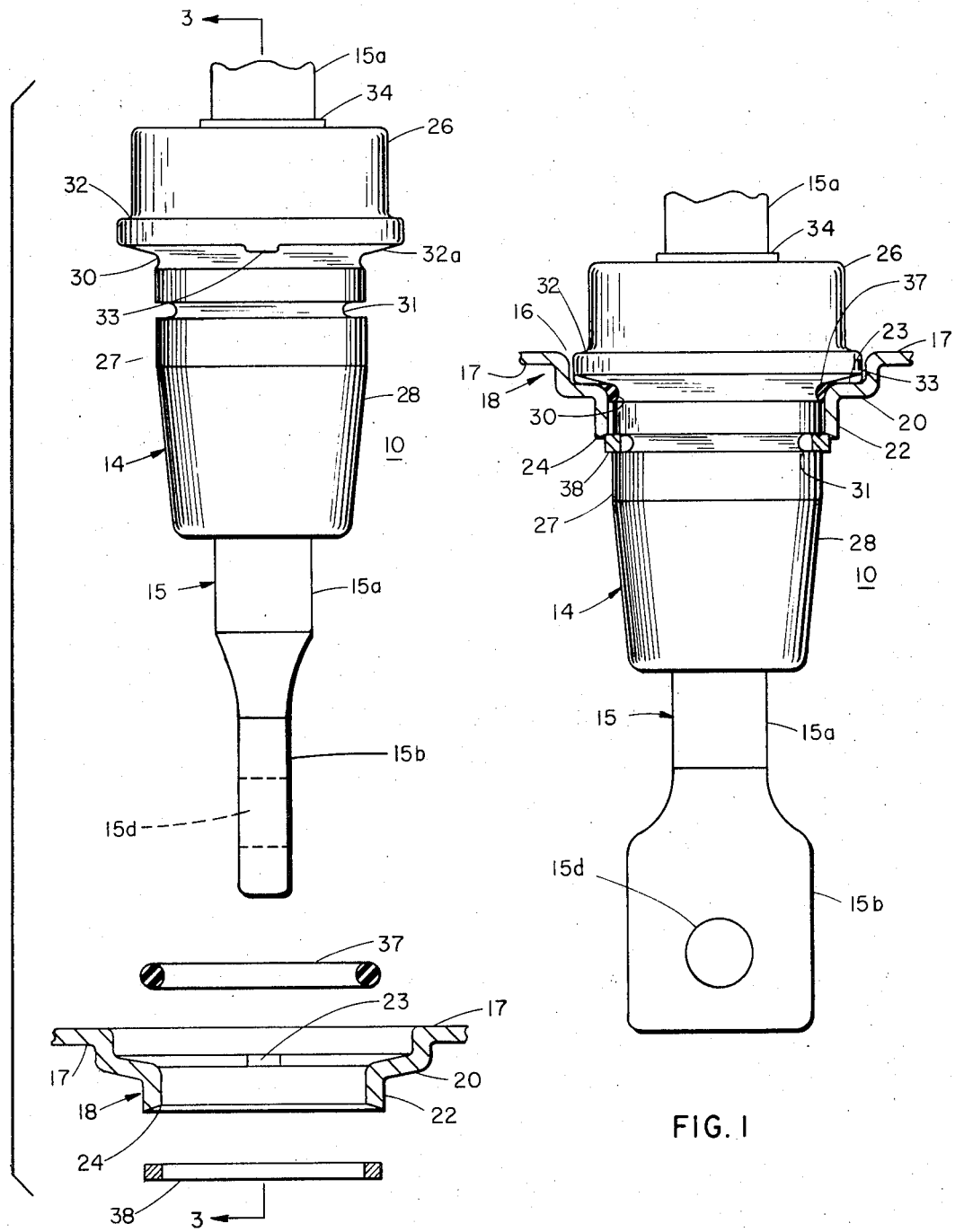

PATENTED JAN 2 1973 3,708,612

INVENTORS
JAMES B. SAXON
JACKIE J. DUNN, SR.

BY
Harold J. Rathbun

ELECTRICAL BUSHING ASSEMBLY

This invention relates to an electrical bushing assembly comprising an insulating bushing and a conductor surrounded by the bushing, and more particularly to such a bushing assembly having improved sealing and interlocking means between the conductor and the bushing and improved means for securing and sealing the bushing assembly within an opening in a casing for electrical apparatus.

Difficulties have been experienced in securing a conductor within an opening in an insulating bushing so that the bushing assembly thus formed resists thermal and mechanical stresses while still providing a gas-tight seal between the conductor and bushing. Further, difficulties have been experienced in securing such a bushing assembly within an opening in a casing so that a gas-tight seal is provided between the assembly and the casing and relative motion between the assembly and casing prevented without the use of complex means for securing the assembly in position with respect to the casing.

In accordance with this invention, a conductor and an insulating bushing molded around a cylindrical portion thereof are held against relative movement by complementary interlocking means on the bushing and the conductor, and the bushing assembly is mechanically interlocked with a boss around an opening in the casing by projections on the bushing received in recesses in the inner wall of the boss. Improved sealing means are provided between the conductor and bushing and between the bushing and the boss, and a simple snap-ring serves to retain the assembly in position. The snap-fastening facilitates mounting and dismounting of the bushing assembly and permits its re-use.

It is an object of this invention to provide an improved bushing assembly for electrical apparatus.

Another object is to provide an electrical bushing assembly having improved sealing means between an insulating bushing and a conductor passing therethrough.

Still another object is to eliminate the need for a bond between a cylindrical portion of a conductor and the insulating bushing of an electrical bushing assembly by providing an improved mechanical interlock to restrain both axial and rotary motion of the conductor with respect to the bushing.

A further object is to provide an electrical bushing assembly including improved means for holding the bushing assembly in sealed relationship within an opening in a casing.

A more specific object is to provide an improved electrical bushing assembly wherein complementary portions of a casing and the bushing of the bushing assembly interlock to retain the bushing against rotation with respect to the casing.

BRIEF DESCRIPTION OF THE DRAWINGS

Further objects and advantages of this invention will become apparent when considered in the light of the following description wherein reference is made to the drawings, in which:

FIG. 1 is a side view, partly in section, of a bushing assembly in accordance with this invention shown in assembled relation with a casing for electrical apparatus;

FIG. 2 is an exploded view, partly in section, of the bushing assembly and casing of FIG. 1 looking from the right or left of FIG. 1;

DESCRIPTION OF THE PREFERRED EMBODIMENT

Figure 3:
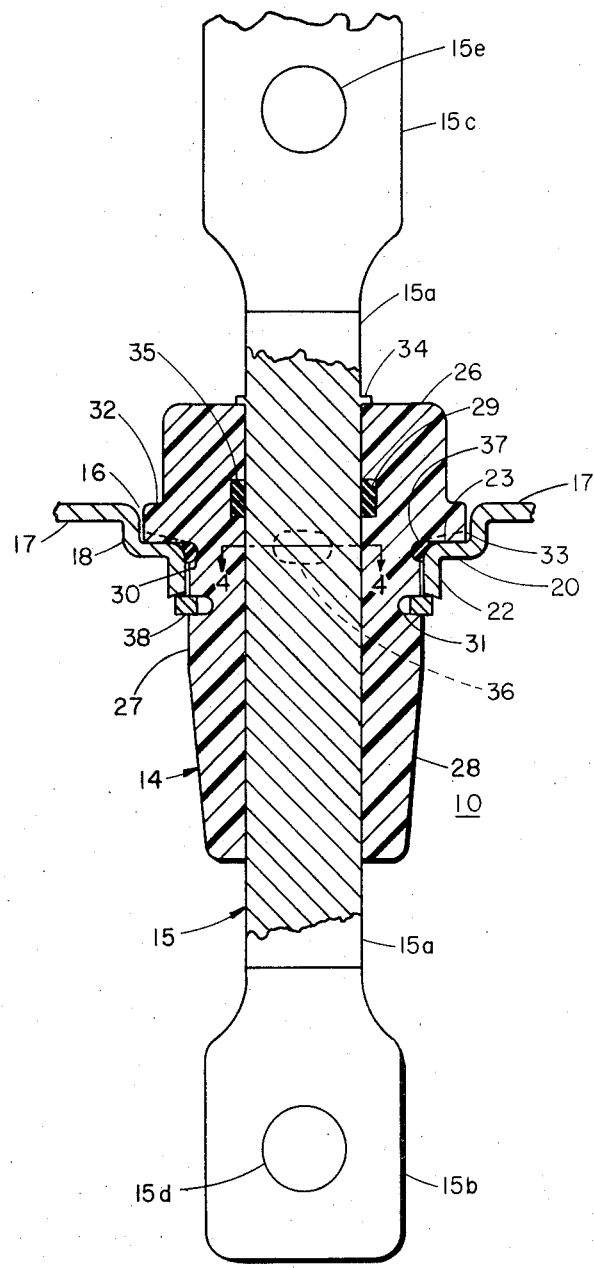
FIG. 3 is a sectional view taken generally as indicated by the arrows 3—3 of FIG. 2.
Figure 4:
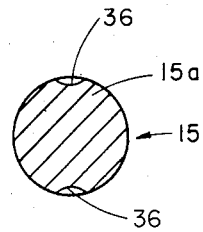
FIG. 4 is a sectional view of a conducting member of the bushing assembly taken generally along the line 4—4 in FIG. 3.
Figure 5:
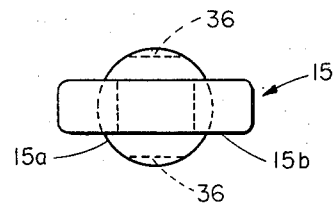
FIG. 5 is a bottom view of the conducting member of the bushing assembly.

Referring to the drawings, a bushing assembly 10 in accordance with this invention comprises a generally cylindrical insulating bushing 14 and an elongated conducting member or conductor 15 about which the bushing 14 is formed. The assembly 10 is designed to be received in a circular opening 16 in a wall 17 of a housing or casing for electrical apparatus such as a transformer (not shown), the conductor 15 serving to connect a load circuit (not shown) to the transformer.

In the illustrated embodiment, the wall 17 is an upper wall of the casing, and an interiorly or downwardly directed boss 18 is integrally formed about the opening 16. A radially and inwardly directed, downwardly sloping circumferential step portion 20 (shown most clearly in FIG. 2) of the boss 18 terminates in a downwardly directed cylindrical flange 22. Formed in the step portion 20 are a pair of generally wedge-shaped indentations or recesses 23 preferably spaced 180° apart. An inner end face 24 of the flange 22 preferably slopes downwardly toward the outer periphery of the flange as shown.

The bushing 14 is a generally cylindrical tubular body of electrically insulating material, such as alkyd polyester, and varies in diameter along its length. An upper portion 26 of the bushing 14 is of substantially uniform cross section and is somewhat larger in diameter than an intermediate portion 27 also of substantially uniform cross section. A lower portion 28 of the bushing 14 is of frusto-conical shape tapering downwardly. The upper portion 26 has an internal annular groove 29 (FIG. 3), and the intermediate portion 27 has two axially spaced external annular grooves 30 and 31. An integrally formed annular collar 32 of the bushing 14 disposed between the upper portion 26 and the intermediate portion 27 has a lower face 32a which slopes downwardly and inwardly to merge with the groove 30. Extending downwardly from the face 32a are two circumferentially spaced projections 33 which are complementary to the indentations 23 in the step portion 20 and spaced like distances apart.

The bushing 14 is preferably molded about a cylindrical central portion 15a of the conductor 15. An axial opening is thus formed in the bushing 14 through which the conductor 15 extends with opposite end portions 15b and 15c of the conductor 15 extending outwardly axially of the bushing 14. Openings 15d and 15e are provided in flattened end portions 15b and 15c, respectively, of the conductor 15 to receive bolt-on type conductors (not shown). The upper end face of the bushing 14 abuts on an annular collar 34 integral with the conductor 15 which serves as a stop during the molding process. Further, the collar 34 is sized to cause a high electrical field gradient when the bushing assembly is in use to insure harmless external flash over of electrical charges on the surface of the conductor 15 under all conditions of applied voltage.

A suitable O-ring 35, preferably formed of silicone, is placed around the conductor 15 prior to the molding process. The internal groove 29 is thus formed in the molding process and the pressure exerted by the molding compound during molding establishes a gas-tight seal between the bushing 14 and the conductor 15.

Interlocking means for retaining the bushing 14 in fixed relation with the conductor 15 is provided internally at the intermediate portion 27 of the bushing 14. The central portion 15a of the conductor 15 is provided with two recesses 36 which represent an area of reduced cross section of the central portion 15a and which are preferably 180° apart. The bushing 14 is molded about the central portion 15a and, during the molding process, the insulating material of the bushing 14 flows into the recesses 36 resulting in inwardly directed projecting portions or protrusions integral with the bushing 14, the recesses and protrusions thus forming an interlocking means for mechanically interlocking the bushing 14 to the conductor 15 to prevent relative movement therebetween. Although two recesses 36 and protrusions are shown, it will be understood that any desired number of recesses and cooperating protrusions could be provided.

When the bushing 14 is inserted into the opening 16 in the wall 17 of the casing, the downwardly sloping upper surface of the step portion 20 abuts the sloping lower face 32a of the bushing 14. The two projections 33 which extend from the lower face 32a of the collar 32 are aligned with and snugly seat respectively in the two complementary indentations 23 formed in the step 20 of the boss 18 to make misinstallation impossible and to prevent rotary motion of the bushing assembly 10 with respect to the casing 17.

An external O-ring 37 received in the annular groove 30 provides an external gas-tight seal between the bushing 14 and the boss 18. The assembly 10 is held in position in the boss 18 and sealing pressure is exerted against the O-ring 37 by a snap-ring 38 received in the annular groove 31 and abutting the lower edge face 24 of the flange 22. The lower edge face 24 is beveled as previously described to compensate for variations in the dimensions of the bushing or the boss within design tolerance. It is thus apparent that the assembled bushing 10 is non-rotatably held in sealed relation with the casing 17 and is readily removable therefrom.

We claim:

1. A bushing assembly for connecting a load circuit to electrical apparatus within a casing, said bushing assembly comprising an elongated conducting member having a cylindrical central portion, an insulating bushing molded about the cylindrical central portion and receivable in an opening in a wall of the casing, the conducting member having inner and outer end portions extending axially away from the bushing from respective opposite ends thereof, cooperating interlocking means between the bushing and the conducting member including a recess in the central portion of the conducting member and a projecting portion of the bushing received in the recess, the projecting portion of the bushing being formed in the recess of the conducting member during the molding process, an internal annular groove in the bushing opening toward the central portion of the conducting member, an O-ring received in the groove and forming a gas-tight seal between the conducting member and the bushing, a first external annular groove in the outer surface of the bushing for reception of a snap ring, an annular collar on the outer surface of the bushing between the external annular groove and the outer end portion of the conducting member and forming a shoulder portion facing the first external annular groove and engageable with a step portion of the wall of the casing about the opening, a second external annular groove in the outer surface of the bushing for receiving an O-ring and positioned closely adjacent to the shoulder portion on the side thereof nearest the first external groove, a projection on the shoulder portion extending axially of the bushing toward the second external groove for reception in a complementary recess in the step portion of the wall of the casing, and an annular collar on the conducting member in abutting relation with the end face of the bushing nearest the outer end portion of the conducting member, said annular collar being sized so as to cause a high electrical field gradient when voltage is impressed on the conducting member thereby to insure harmless external flash over of electrical charges from the surface of the conducting member.

2. The bushing assembly of claim 1 wherein the interlocking means also comprises a second recess spaced circumferentially from said recess on the central portion of the conducting member and a projecting portion of the bushing received in the second recess.

3. The bushing assembly of claim 1 wherein the bushing is formed of an alkyd polyester.

4. A bushing assembly and casing combination, said bushing assembly and casing being in gas-tight engagement with each other, said combination comprising a bushing assembly including a generally cylindrical insulating bushing having an axial opening and an elongated conducting member having a cylindrical central portion which is received in the opening and having inner and outer end portions extending axially away from the bushing from respective opposite ends thereof, the insulating bushing being molded about the cylindrical central portion, interlocking means between the bushing and conducting member, the bushing having an internal annular groove opening toward the central portion of the conducting member, an O-ring received in the groove and forming a gas-tight seal between the conducting member and the bushing, an annular collar about the conducting member in abutting relationship with the end face of the bushing nearest the outer end of the conducting member for preventing leakage of external electrical charges along the conducting member, a casing having walls and a wall of the casing having a circular opening therethrough, an annular boss on the casing wall around the opening extending inwardly of the outer surface of the wall and having an inner end portion radially inset to define an annular step portion, a recess in the step portion of the boss, an annular shoulder on the outer surface of the bushing engaging the step portion, a projection on the shoulder of the bushing received in the recess in the step portion to prevent rotation of the bushing with respect to the casing, an annular groove in the outer surface of the bushing closely adjacent the shoulder portion of the bushing, an O-ring received in the annular groove engaging both the shoulder of the bushing and an inner surface portion of the boss to provide a seal therebetween, a second annular groove in the outer surface of the bushing displaced inwardly of the casing wall from the shoulder of the bushing, said inner end portion of the boss defining an annular edge face, and a snap ring received in the second annular groove and in engagement with the annular edge face of the boss, engagement of the snap ring in the second annular groove compressing the O-ring in the first annular groove thereby to provide a seal between the exterior surface of the bushing and the wall of the casing.

5. The bushing assembly and casing combination of claim 4 wherein the inner edge face slopes downwardly toward the outer periphery of the inner end portion of the boss.

* * * * *